H. B. WHITTEMORE.
Plows.
No. 156,396.
Patented Oct. 27, 1874.
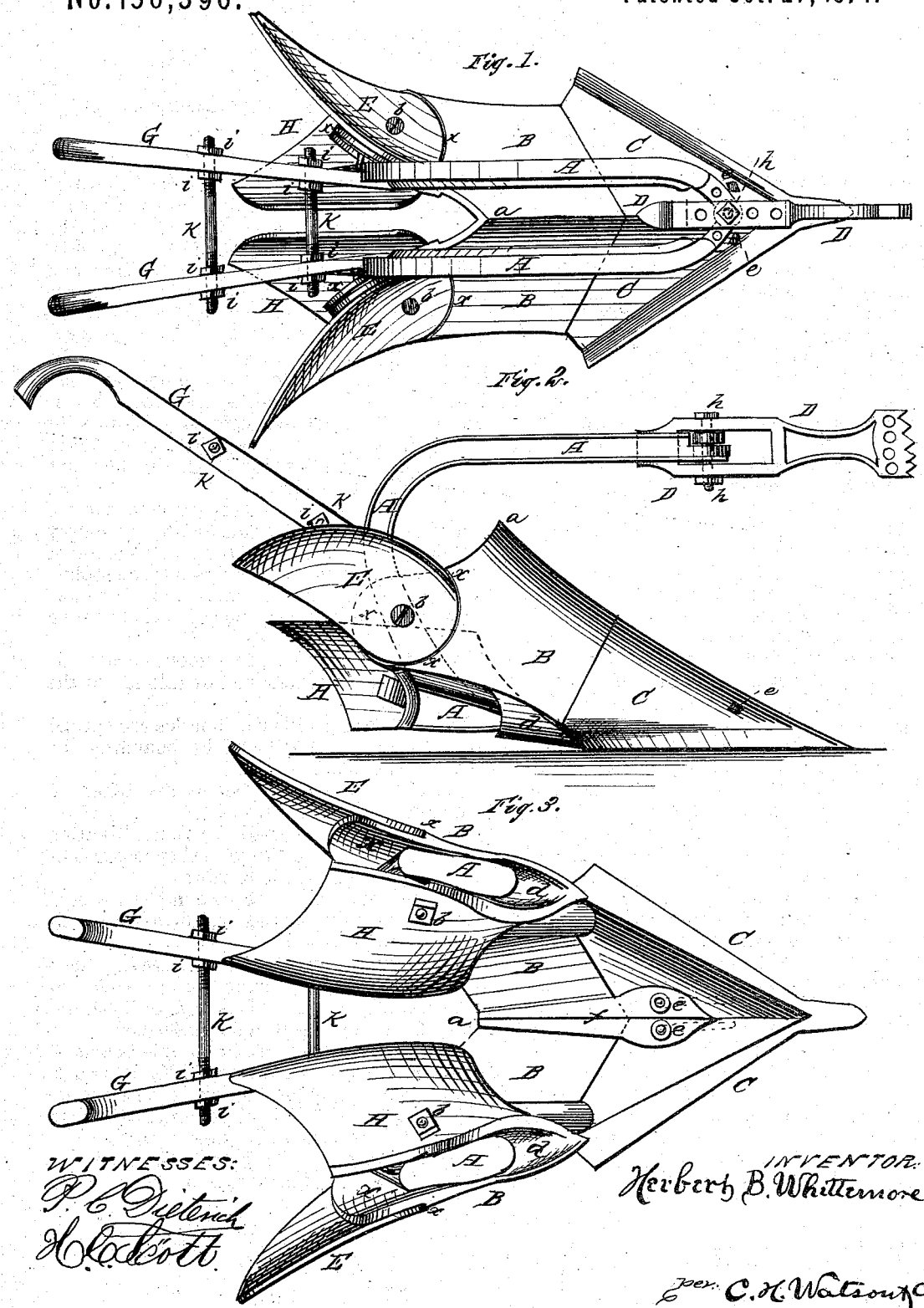

UNITED STATES PATENT OFFICE.

HERBERT B. WHITTEMORE, OF MAINE, NEW YORK.

IMPROVEMENT IN PLOWS.

Specification forming part of Letters Patent No. 156,396, dated October 27, 1874; application filed September 7, 1874.

*To all whom it may concern:*

Be it known that I, HERBERT B. WHITTEMORE, of Maine, in the county of Broome and State of New York, have invented certain new and useful Improvements in Plows; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a plow for covering and hilling corn, potatoes, cotton, and other small vegetables, as will be hereinafter more fully set forth.

In the accompanying drawing, Figure 1 is a top view. Fig. 2 is a side elevation, and Fig. 3 is a bottom view.

A A represent two curved plow-beams, the lower ends of which are connected by having a double mold-board, B, attached to them. This double mold-board forms a sharp ridge or edge, $a$, in the center, and is attached by two bolts, $b$, to the two plow-beams, said bolts passing through the upper rear parts of the mold-board. On the under side of the mold-board are lugs or stops $d$, between which the plow-beams are fitted, so as to be held firmly in place. The angle of the mold-board B is re-enforced on the under side, and from the same projects a wing or angular bar, $f$, to which the double plow share or point C is secured by means of bolts $e\ e$. One of the lugs $d$, on each side of the mold-board, projects below the mold-board and forms a stop or guide for the share. The front ends of the plow-beams are inserted in a horizontally-slotted bar, D, where they are held by a bolt, $h$, passing through them. In this bar is a series of holes, so that the plow-beams may be adjusted forward or backward, as desired. The front end of the bar D is constructed in the usual manner for plow-beams for the adjustment up and down of a clevis on the same. The rear part of the mold-board B, on each side, is made with a shoulder or offset, $x$, which is made on a circle having the bolt $b$ for its center, and on this part of the mold-board is fastened a wing, E, by the bolt $b$ passing through the same, the lower end of the wing being formed to correspond with the curved shoulder $x$.

By simply loosening the bolts $b$ the wings E may be adjusted up or down, as required.

To the lower rear portion of each plow-beam A is attached a handle, G, and these two handles have screw-rods $k$ passing through and connecting them. On each screw-rod are nuts $i$ on both sides of each handle, whereby the handles may be adjusted at any distance apart and held firmly, as desired.

On the inner side of each plow-beam and handle, at the lower end, is attached a covering-plow, H, which consists of a plow-point and mold-board, of somewhat the ordinary shape for a turning-plow. These plows are turned inward, as shown.

With the plow as thus constructed the operator can hill any desired height by simply adjusting the wings E. By turning them down they will throw the soil up against the stalks, leaving it equally as well as if done by a hoe.

In hilling the covering-plows H may be taken off.

For covering, the double mold-board B, with its wings E, is removed by taking out the bolts $b$.

To make larger hills the handles are spread and the beams lengthened by changing the bolt $h$ in the bar D.

To cover shallow the beams are taken up short and the handles closed.

This plow may be used for the cultivation of corn, potatoes, cotton, or other vegetables that are planted in hills or rows.

Having thus fully described my invention, what I claim as new, and desire to secure by Letters Patent, is—

1. The two plow-beams A A, having their front ends adjustably connected in the slotted draft-bar D by means of a bolt, $h$, or its equivalent, as and for the purpose described.

2. The combination of the double beams A A, handles G, and screw-rods K K, constructed as described, and adapted to receive the hilling-plow or the pair of covering-plows, as and for the purpose herein described.

In testimony that I claim the foregoing as my own I affix my signature in presence of two witnesses.

HERBERT B. WHITTEMORE.

Witnesses:
SILAS ALLEN,
F. B. SMITH.